US012036978B2

(12) United States Patent
Aoki et al.

(10) Patent No.: US 12,036,978 B2
(45) Date of Patent: Jul. 16, 2024

(54) DRIVING ASSISTANCE METHOD AND DRIVING ASSISTANCE DEVICE

(71) Applicant: Nissan Motor Co., Ltd., Yokohama (JP)

(72) Inventors: Motonobu Aoki, Kanagawa (JP); Yasuhiko Fukazawa, Kanagawa (JP); Shinichirou Nakajima, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 411 days.

(21) Appl. No.: 17/422,595

(22) PCT Filed: Jan. 15, 2019

(86) PCT No.: PCT/IB2019/000052

§ 371 (c)(1),
(2) Date: Jul. 13, 2021

(87) PCT Pub. No.: WO2020/148561

PCT Pub. Date: Jul. 23, 2020

(65) Prior Publication Data

US 2021/0387615 A1 Dec. 16, 2021

(51) Int. Cl.
*B60W 30/09* (2012.01)

(52) U.S. Cl.
CPC ......... *B60W 30/09* (2013.01); *B60W 2520/04* (2013.01); *B60W 2520/06* (2013.01); *B60W 2552/10* (2020.02); *B60W 2554/4041* (2020.02); *B60W 2554/4044* (2020.02); *B60W 2554/4046* (2020.02); *B60W 2554/4049* (2020.02)

(58) Field of Classification Search
CPC ......... B60W 30/09; B60W 2554/4041; B60W 2554/4044; B60W 2554/4046; B60W 2554/4049; B60W 2520/04; B60W 2520/06
USPC ............................................................. 701/26
See application file for complete search history.

(56) References Cited

U.S. PATENT DOCUMENTS 10,816,982 B2 * 10/2020 Lee .................. G08G 1/096783
11,097,724 B2 * 8/2021 Maeda ................... G08G 1/163
11,299,149 B2 * 4/2022 Yan .................. G08G 1/096791
11,299,160 B2 * 4/2022 Nishiguchi ........... B60W 10/18
11,427,218 B2 * 8/2022 Motoyama ........... G05D 1/0088
(Continued)

FOREIGN PATENT DOCUMENTS

EP 2263926 A2 * 12/2010 ................ B60T 7/22
EP 2266852 A1 * 12/2010 .......... B60T 8/17557
(Continued)

*Primary Examiner* — Tuan C To
(74) *Attorney, Agent, or Firm* — Young Basile Hanlon & MacFarlane, P.C.

(57) ABSTRACT

A driving assistance method includes: detecting a position of a first obstacle ahead of a host vehicle on a first lane where the host vehicle is traveling; detecting a position of a second obstacle ahead of the host vehicle on a second lane, the second lane being an oncoming lane adjacent to the first lane; when the position of the second obstacle is on a nearer side than the position of the first obstacle in a traveling direction of the host vehicle, determining a first stop position as a stop position of the host vehicle to a position before the second obstacle in the traveling direction of the host vehicle; and assisting the host vehicle to stop at the determined first stop position.

12 Claims, 10 Drawing Sheets

(56) References Cited

U.S. PATENT DOCUMENTS

| | | | | |
|---|---|---|---|---|
| 11,636,375 | B2 * | 4/2023 | Olabiyi | G08G 1/0129 706/12 |
| 2009/0153665 | A1 * | 6/2009 | Linsenmaier | B60R 1/007 348/149 |
| 2015/0039156 | A1 | 2/2015 | Shibata | |
| 2015/0224988 | A1 * | 8/2015 | Buerkle | B60W 30/0956 701/45 |
| 2017/0197551 | A1 * | 7/2017 | Lee | B60W 50/14 |
| 2018/0012496 | A1 * | 1/2018 | Hasberg | B60W 30/18163 |
| 2019/0152476 | A1 * | 5/2019 | Hajika | B62D 6/00 |
| 2019/0202497 | A1 * | 7/2019 | Hajika | G05B 6/02 |
| 2019/0283748 | A1 * | 9/2019 | Hajika | G06V 20/588 |
| 2021/0009128 | A1 * | 1/2021 | Jokela | B60W 30/162 |

FOREIGN PATENT DOCUMENTS

| | | | | |
|---|---|---|---|---|
| EP | 2747056 | A1 * | 6/2014 | B60W 30/08 |
| EP | 3269607 | A1 * | 1/2018 | B60R 21/0134 |
| JP | 2008-174023 | A | 7/2008 | |
| JP | 2008-217079 | A | 9/2008 | |
| JP | 2013-184563 | A | 9/2013 | |
| JP | 2016-112911 | A | 6/2016 | |
| JP | 2016-143137 | A | 8/2016 | |

* cited by examiner

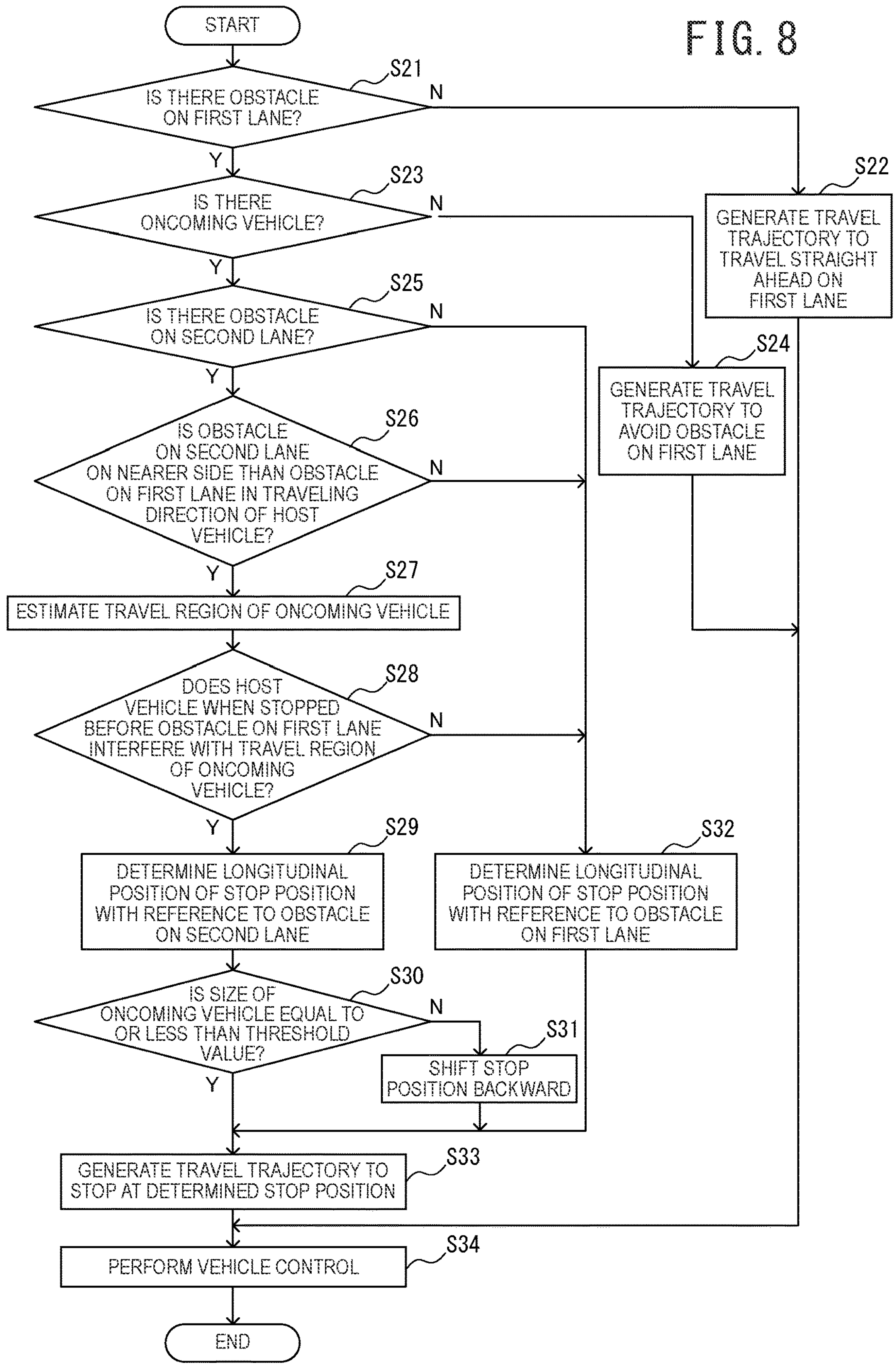
FIG. 8
START
S21
IS THERE OBSTACLE ON FIRST LANE?
N
Y
S22
GENERATE TRAVEL TRAJECTORY TO TRAVEL STRAIGHT AHEAD ON FIRST LANE
S23
IS THERE ONCOMING VEHICLE?
N
Y
S24
GENERATE TRAVEL TRAJECTORY TO AVOID OBSTACLE ON FIRST LANE
S25
IS THERE OBSTACLE ON SECOND LANE?
N
Y
S26
IS OBSTACLE ON SECOND LANE ON NEARER SIDE THAN OBSTACLE ON FIRST LANE IN TRAVELING DIRECTION OF HOST VEHICLE?
N
Y
S27
ESTIMATE TRAVEL REGION OF ONCOMING VEHICLE
S28
DOES HOST VEHICLE WHEN STOPPED BEFORE OBSTACLE ON FIRST LANE INTERFERE WITH TRAVEL REGION OF ONCOMING VEHICLE?
N
Y
S29
DETERMINE LONGITUDINAL POSITION OF STOP POSITION WITH REFERENCE TO OBSTACLE ON SECOND LANE
S32
DETERMINE LONGITUDINAL POSITION OF STOP POSITION WITH REFERENCE TO OBSTACLE ON FIRST LANE
S30
IS SIZE OF ONCOMING VEHICLE EQUAL TO OR LESS THAN THRESHOLD VALUE?
N
Y
S31
SHIFT STOP POSITION BACKWARD
S33
GENERATE TRAVEL TRAJECTORY TO STOP AT DETERMINED STOP POSITION
S34
PERFORM VEHICLE CONTROL
END

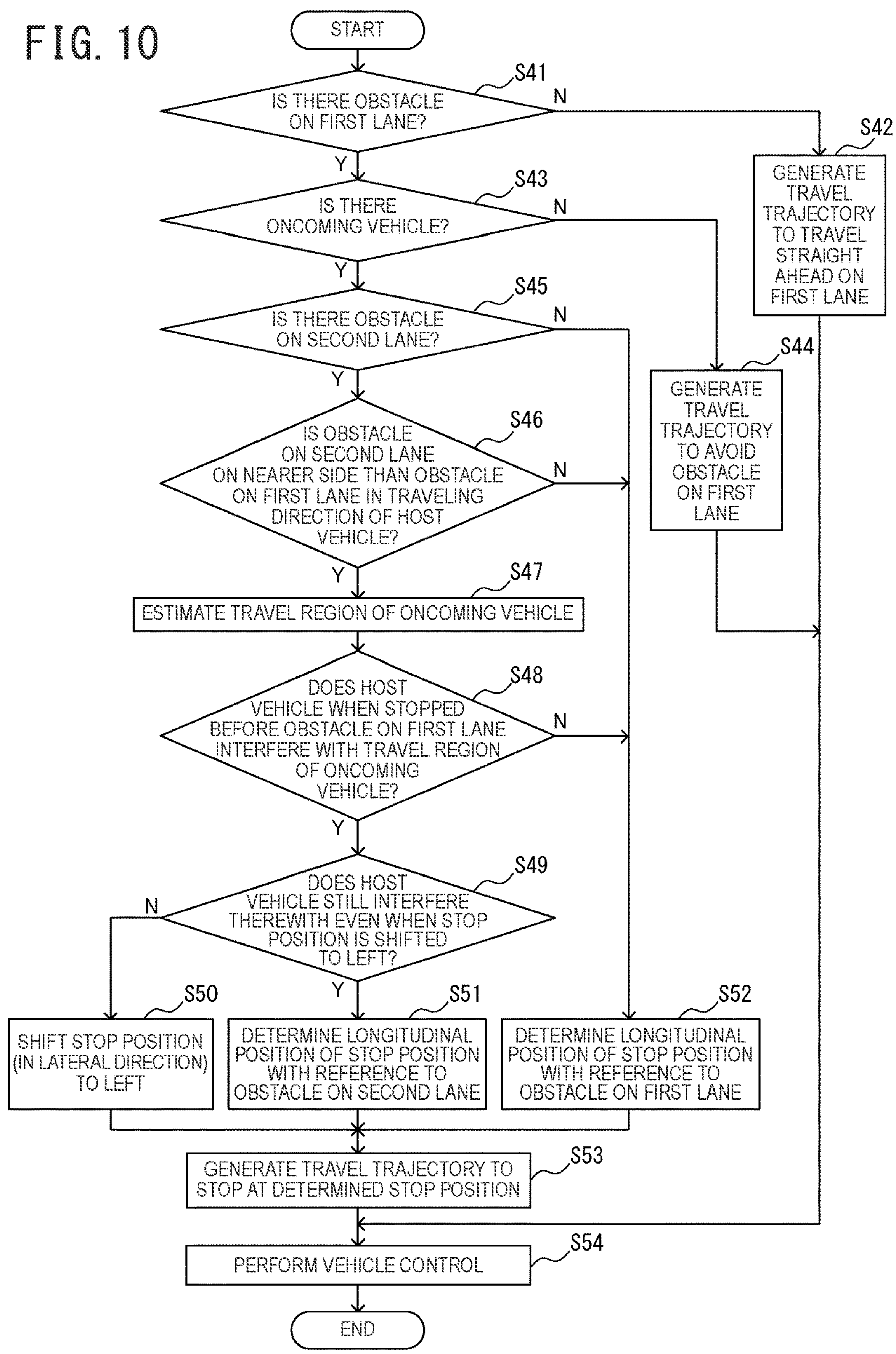
FIG. 10
START
IS THERE OBSTACLE ON FIRST LANE?
S41
N
Y
S42
GENERATE TRAVEL TRAJECTORY TO TRAVEL STRAIGHT AHEAD ON FIRST LANE
IS THERE ONCOMING VEHICLE?
S43
IS THERE OBSTACLE ON SECOND LANE?
S45
S44
GENERATE TRAVEL TRAJECTORY TO AVOID OBSTACLE ON FIRST LANE
IS OBSTACLE ON SECOND LANE ON NEARER SIDE THAN OBSTACLE ON FIRST LANE IN TRAVELING DIRECTION OF HOST VEHICLE?
S46
S47
ESTIMATE TRAVEL REGION OF ONCOMING VEHICLE
DOES HOST VEHICLE WHEN STOPPED BEFORE OBSTACLE ON FIRST LANE INTERFERE WITH TRAVEL REGION OF ONCOMING VEHICLE?
S48
DOES HOST VEHICLE STILL INTERFERE THEREWITH EVEN WHEN STOP POSITION IS SHIFTED TO LEFT?
S49
S50
SHIFT STOP POSITION (IN LATERAL DIRECTION) TO LEFT
S51
DETERMINE LONGITUDINAL POSITION OF STOP POSITION WITH REFERENCE TO OBSTACLE ON SECOND LANE
S52
DETERMINE LONGITUDINAL POSITION OF STOP POSITION WITH REFERENCE TO OBSTACLE ON FIRST LANE
GENERATE TRAVEL TRAJECTORY TO STOP AT DETERMINED STOP POSITION
S53
PERFORM VEHICLE CONTROL
S54
END

DRIVING ASSISTANCE METHOD AND DRIVING ASSISTANCE DEVICE

TECHNICAL FIELD

The present invention relates to a driving assistance method and a driving assistance device.

BACKGROUND

A technology disclosed in JP 2016-112911 A is known as a technology for stopping a host vehicle in response to an obstacle ahead of the host vehicle. A vehicular travel control device disclosed in JP 2016-112911 A sets a stop position of the host vehicle according to a position of a parked vehicle ahead of the host vehicle to facilitate overtaking driving after stopping at the stop position.

SUMMARY

However, in the vehicular travel control device disclosed in JP 2016-112911 A, when there is an obstacle on both a travel lane of the host vehicle and an oncoming lane, the stopped host vehicle and the obstacle on the oncoming lane both can obstruct travel of an oncoming vehicle.

It is an object of the present invention to prevent a host vehicle stopped in response to an obstacle ahead of the host vehicle and an obstacle on an oncoming lane from obstructing the travel of an oncoming vehicle.

According to an aspect of the present invention, there is provided a driving assistance method including: detecting a position of a first obstacle ahead of a host vehicle on a first lane where the host vehicle is traveling; detecting a position of a second obstacle ahead of the host vehicle on a second lane, the second lane being an oncoming lane adjacent to the first lane; when the position of the second obstacle is on a nearer side than the position of the first obstacle in a traveling direction of the host vehicle, determining a first stop position as a stop position of the host vehicle to a position before the second obstacle in the traveling direction of the host vehicle; and assisting the host vehicle to stop at the determined first stop position.

According to an aspect of the present invention, it is possible to prevent a host vehicle stopped in response to an obstacle ahead of the host vehicle and an obstacle on an oncoming lane from obstructing the travel of an oncoming vehicle.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF THE DRAWINGS

FIG. 8 is a flowchart illustrating an example of a driving assistance method according to a second embodiment;

FIG. 10 is a flowchart illustrating an example of a driving assistance method according to a third embodiment.

DETAILED DESCRIPTION

Hereinafter, first to third embodiments of the present invention will be described with reference to the drawings. In the following description of the drawings, the same or similar portions are denoted by the same or similar reference signs. However, the drawings are schematic. The technological idea of the present invention may be variously modified within the technological scope defined in the appended claims.

First Embodiment (Driving Assistance Device)

A driving assistance device according to a first embodiment is, for example, mounted in a vehicle (hereinafter, a vehicle mounted with the driving assistance device according to the embodiment is referred to as "host vehicle"). The driving assistance device according to the first embodiment can execute, as driving assistance, automatic driving for automatically driving so that the host vehicle travels along a travel route and guidance for prompting a driver to drive so that the host vehicle travels along the travel route.

The automatic driving includes cases where all controls of driving, braking, and steering of the host vehicle are executed without involvement of a vehicle occupant (the driver) and also cases where at least one control of either driving or braking of the host vehicle is performed. The automatic driving may be preceding vehicle following control, inter-vehicle distance control, and the like.

Figure 1:
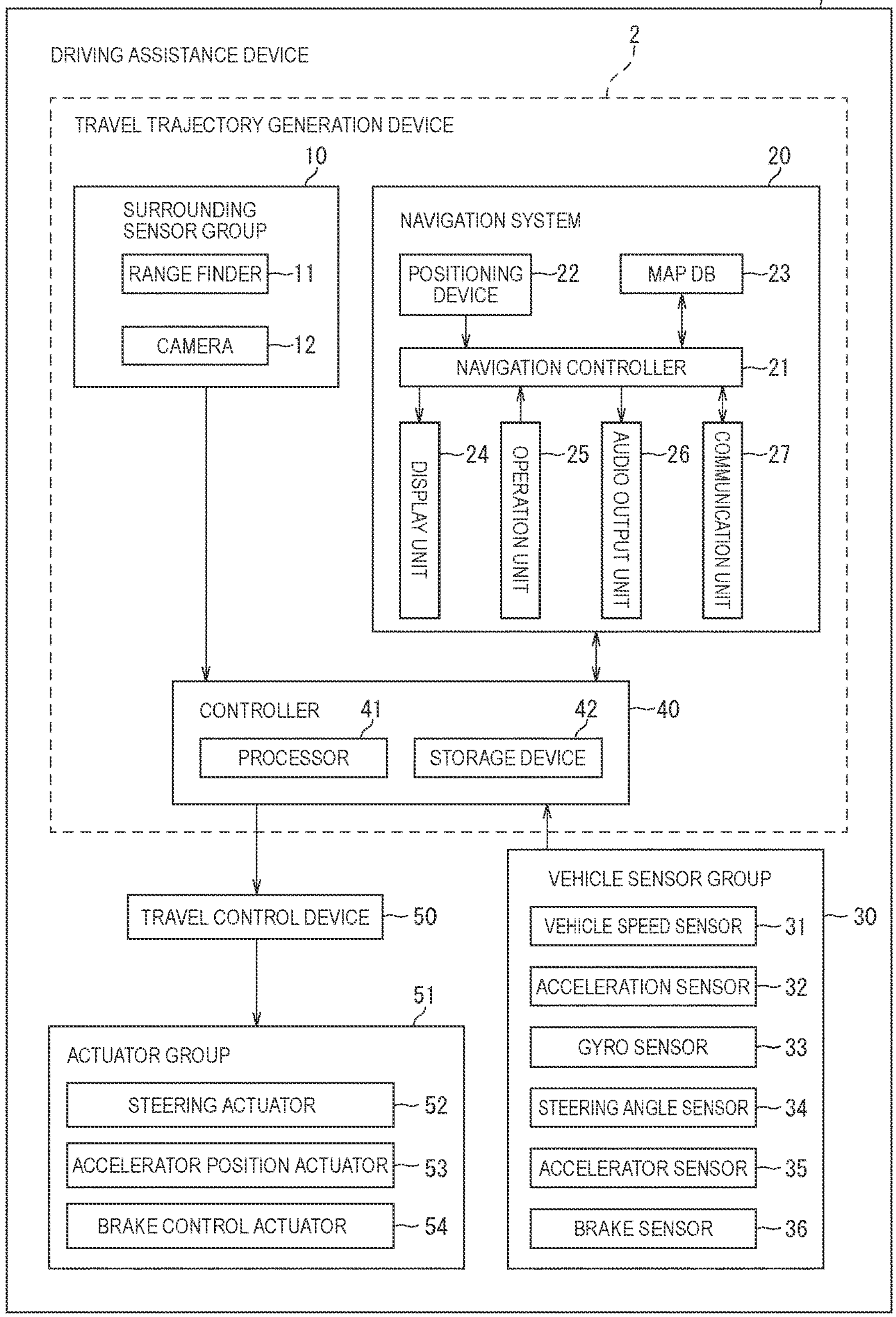
FIG. 1 is a block diagram illustrating an example of a driving assistance device according to a first embodiment.

As illustrated in FIG. 1, a driving assistance device 1 according to the first embodiment includes a surrounding sensor group 10, a navigation system 20, a vehicle sensor group 30, a controller 40, a travel control device 50, and an actuator group 51.

The surrounding sensor group 10 is a sensor group configured to detect an ambient environment of the host vehicle, for example, objects around the host vehicle. The surrounding sensor group 10 detects, for example, obstacles ahead of the host vehicle on a travel lane of the host vehicle and an oncoming lane. The surrounding sensor group 10 may include a range finder 11 and a camera 12. The range finder 11 and the camera 12 detect the ambient environment of the host vehicle, including objects present around the host vehicle, relative positions between the host vehicle and the objects, and distances between the host vehicle and the objects.

The range finder 11 may be, for example, a laser range-finder (LRF) or a radar. The camera 12 may be, for example, a stereo camera. The camera 12 may be a monocular camera, through which the same object may be imaged from a plurality of viewpoints to calculate a distance to the object. Alternatively, the distance to the object may be calculated on the basis of a ground contact position of the object detected from a captured image. The range finder 11 and the camera 12 output ambient environment information that is information on the detected ambient environment to the controller 40.

The navigation system 20 recognizes a current position of the host vehicle and road map information at the current position. The navigation system 20 sets a travel route to a destination input by the vehicle occupant, and gives a route guidance to the vehicle occupant according to the travel route. The navigation system 20 outputs information on the set travel route to the controller 40. When the traveling state of the host vehicle is in an automatic driving mode, the controller 40 automatically drives the host vehicle so as to travel along the travel route set by the navigation system 20.

The navigation system 20 includes a navigation controller 21, a positioning device 22, a map database (DB) 23, a display unit 24, an operation unit 25, an audio output unit 26, and a communication unit 27. The navigation controller 21 is an electronic control unit (ECU) configured to control information processing operation of the navigation system 20. The navigation controller 21 includes a processor and peripheral components thereof. The processor may be, for example, a central processing unit (CPU) or a micro-processing unit (MPU). The peripheral components include a storage device and the like. The storage device may include any of a semiconductor storage device, a magnetic storage device, and an optical storage device. The storage device may include memories, such as register, cache memory, and read only memory (ROM) and random access memory (RAM) used as primary storage devices.

The positioning device 22 measures the current position of the host vehicle. The positioning device 22 may be, for example, a global positioning system (GPS) receiver. Additionally, the positioning device 22 may measure a current position of the host vehicle on the basis of a satellite signal of another satellite positioning system, such as a global navigation satellite system (GLONASS). Alternatively, the positioning device 22 may be an inertial navigation device.

The map database 23 stores road map data. The road map data includes information on road line types, road shapes, slopes, the number of lanes, legal speeds (speed limits), road widths, priority regulations for designating priority roads, stop regulations for designating temporary stop and the like, and the presence or absence of junctions. The road types include, for example, general roads and highways.

The display unit 24 outputs various pieces of visual information in the navigation system 20. For example, the display unit 24 may display a map screen around the host vehicle and guidance on a recommended route. The operation unit 25 receives operation by the vehicle occupant in the navigation system 20. The operation unit 25 may be, for example, a button, a dial, a slider, or the like, or may be a touch panel provided on the display unit 24. For example, the operation unit 25 may receive an operation for inputting a destination and an operation for switching the display screen of the display unit 24 by the vehicle occupant.

The audio output unit 26 outputs various pieces of audio information in the navigation system 20. The audio output unit 26 may output driving guidance based on the set travel route and road guidance information based on the road map data around the host vehicle. The communication unit 27 performs wireless communication with a communication device outside the host vehicle. A communication system by the communication unit 27 may be, for example, wireless communication by a public mobile phone network, vehicle-to-vehicle communication, road-to-vehicle communication, or satellite communication. The navigation system 20 may acquire the road map data from an external device via the communication unit 27.

The vehicle sensor group 30 includes sensors configured to detect a traveling state of the host vehicle and sensors configured to detect driving operations performed by the driver. The sensors configured to detect the traveling state of the host vehicle include a vehicle speed sensor 31, an acceleration sensor 32, and a gyro sensor 33. The vehicle speed sensor 31 detects a wheel speed of the host vehicle, and calculates a speed of the host vehicle on the basis of the wheel speed. The acceleration sensor 32 detects an acceleration in a longitudinal direction of the host vehicle, an acceleration in a vehicle width direction thereof, and an acceleration in a vertical direction thereof. The gyro sensor 33 detects an angular velocity of a rotation angle of the host vehicle about three axes including a roll axis, a pitch axis, and a yaw axis.

The sensors configured to detect driving operations include a steering angle sensor 34, an accelerator sensor 35, and a brake sensor 36. The steering angle sensor 34 detects a current steering angle that is a current rotation angle (steering operation amount) of a steering wheel serving as a steering operation element. The accelerator sensor 35 detects an accelerator position of the host vehicle. For example, the accelerator sensor 35 detects, as the accelerator position, a depression amount of an accelerator pedal of the host vehicle. The brake sensor 36 detects an amount of brake operation by the driver. For example, the brake sensor 36 detects, as the amount of brake operation, a depression amount of a brake pedal of the host vehicle.

Information on the speed, acceleration, angular velocity, steering angle, accelerator position, and brake operation amount of the host vehicle detected by the respective sensors of the vehicle sensor group 30 is collectively referred to as "vehicle information". The vehicle sensor group 30 outputs the vehicle information to the controller 40.

The controller 40 is an ECU configured to perform driving assistance for the host vehicle. The controller 40 includes a processor 41 and peripheral components such as a storage device 42. The processor 41 may be, for example, a CPU or an MPU. The storage device 42 may include any of a semiconductor storage device, a magnetic storage device, and an optical storage device. The storage device 42 may include memories such as register, cache memory, and ROM and RAM used as primary storage devices. Note that the controller 40 may be embodied by a functional logic circuit set in a general-purpose semiconductor integrated circuit. For example, the controller 40 may include a programmable logic device (PLD), such as a field-programmable gate array (FPGA), or the like.

The controller 40 generates a travel trajectory that allows the host vehicle to travel on the travel route set by the navigation system 20, on the basis of the ambient environment information input from the surrounding sensor group 10 and the vehicle information input from the vehicle sensor group 30. The controller 40 outputs the generated travel trajectory to the travel control device 50. The surrounding sensor group 10, the navigation system 20, the vehicle sensor group 30, and the controller 40 together can form a travel trajectory generation device 2 configured to generate a travel trajectory that allows the host vehicle to travel.

The travel control device 50 is an ECU configured to perform travel control of the host vehicle. The travel control device 50 includes a processor and peripheral components such as a storage device. The processor may be, for example, a CPU or an MPU. The storage device may include any of a semiconductor storage device, a magnetic storage device, and an optical storage device. The storage device may include memories such as register, cache memory, and ROM and RAM used as primary storage devices.

Note that the travel control device 50 may be embodied by a functional logic circuit set in a general-purpose semiconductor integrated circuit. For example, the travel control device 50 may include a PLD such as a FPGA, or the like. The travel control device 50 may be either an electronic control unit integrated with the controller 40 or a separate electronic control unit. The travel control device 50 drives the actuator group 51 to allow the host vehicle to automatically travel so that the host vehicle travels on the travel trajectory generated by the controller 40.

The actuator group 51 operates the steering wheel, accelerator position, and braking device of the host vehicle in response to a control signal from the controller 40 to cause a vehicle behavior of the host vehicle to occur. The actuator group 51 includes a steering actuator 52, an accelerator position actuator 53, and a brake control actuator 54. The steering actuator 52 controls a steering direction and a steering amount of the steering wheel of the host vehicle. The accelerator position actuator 53 controls the accelerator position of the host vehicle. The brake control actuator 54 controls braking operation of the braking device of the host vehicle.

Next, with reference to FIGS. 2A and 2B, a description will be given of a driving scene where the driving assistance device 1 according to the first embodiment is applied. On a road with one lane on each side, there is an obstacle (hereinafter may be referred to as "first obstacle") 61 ahead of a host vehicle 60 on a first lane L1 (host vehicle lane) where the host vehicle 60 is traveling.

Additionally, an oncoming vehicle 64 is traveling on a second lane L2, which is an adjacent lane (an oncoming lane) adjacent to the first lane L1, and is approaching the host vehicle 60. An alternate long and short dash line 65 indicates a predicted trajectory along which a right end of the oncoming vehicle 64 can pass, and an alternate long and short dash line 66 indicates a predicted trajectory along which a left end of the oncoming vehicle 64 can pass. A region surrounded by the predicted trajectories 65 and 66 is a region through which an entire vehicle body of the traveling oncoming vehicle 64 can pass, and the region is hereafter referred to as "travel region".

Figure 2A:
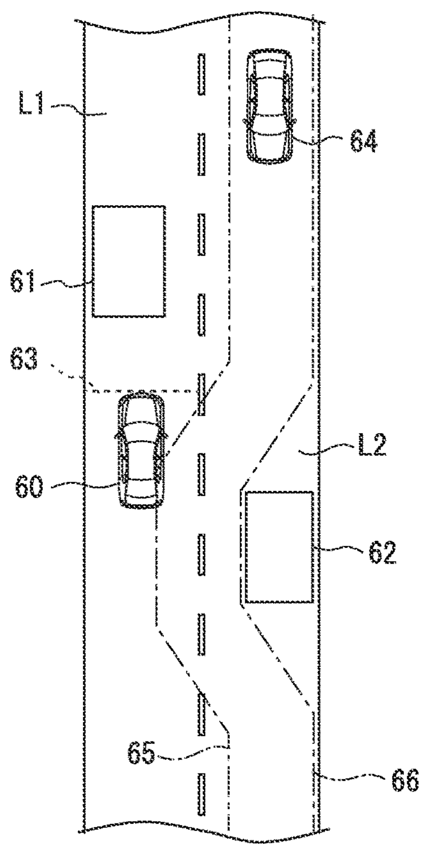
FIG. 2A is a schematic diagram illustrating an example of a driving scene where the driving assistance device according to the first embodiment is applied.

As illustrated in FIG. 2A, when the oncoming vehicle 64 is approaching, the host vehicle 60 cannot avoid the first obstacle 61 beyond a lane boundary line (center line), and therefore needs to stop and wait for completion of passing between the host vehicle 60 and the oncoming vehicle 64.

In such a situation, when there is an obstacle (hereinafter may be referred to as "second obstacle") 62 on a nearer side than the first obstacle 61 (on a lower side in FIGS. 2A and 2B) in a traveling direction of the host vehicle (in the traveling direction on the first lane L1) on the second lane L2, the host vehicle 60 stopped at a position 63 before the first obstacle 61 can interfere with the travel region of the oncoming vehicle 64 that avoids the second obstacle 62. As a result, travel of the oncoming vehicle 64 can be obstructed.

Figure 2B:
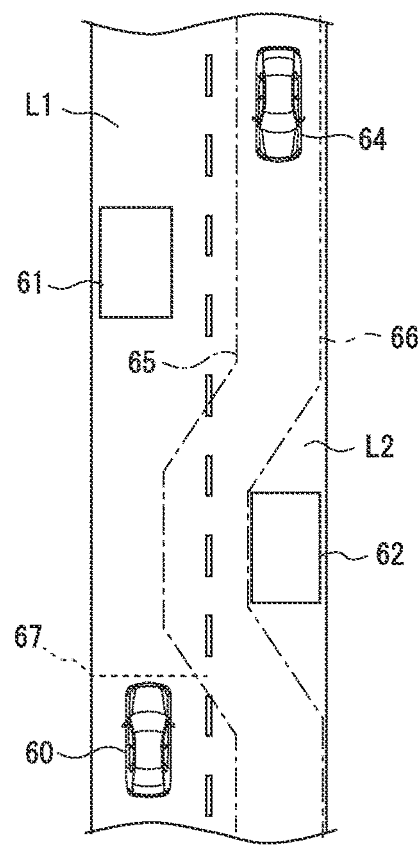
FIG. 2B is a schematic diagram illustrating an example of the driving scene where the driving assistance device according to the first embodiment is applied.

Due to that, as illustrated in FIG. 2B, when the oncoming vehicle 64 is approaching the host vehicle 60 at a position on the nearer side than the second obstacle 62 in the traveling direction and the second obstacle 62 is nearer the host vehicle 60 than the first obstacle 61, the controller 40 determines the stop position of the host vehicle 60 to a stop position (hereinafter referred to as "first stop position") 67 before the second obstacle 62.

Thus, stopping the host vehicle 60 at the first stop position 67 before the second obstacle 62 can prevent the host vehicle 60 from obstructing the travel of the oncoming vehicle 64 that avoids the second obstacle 62. In other words, it is possible to prevent the host vehicle 60 and the second obstacle 62 on the second lane L2 from obstructing the travel of the oncoming vehicle 64.

Figure 3:
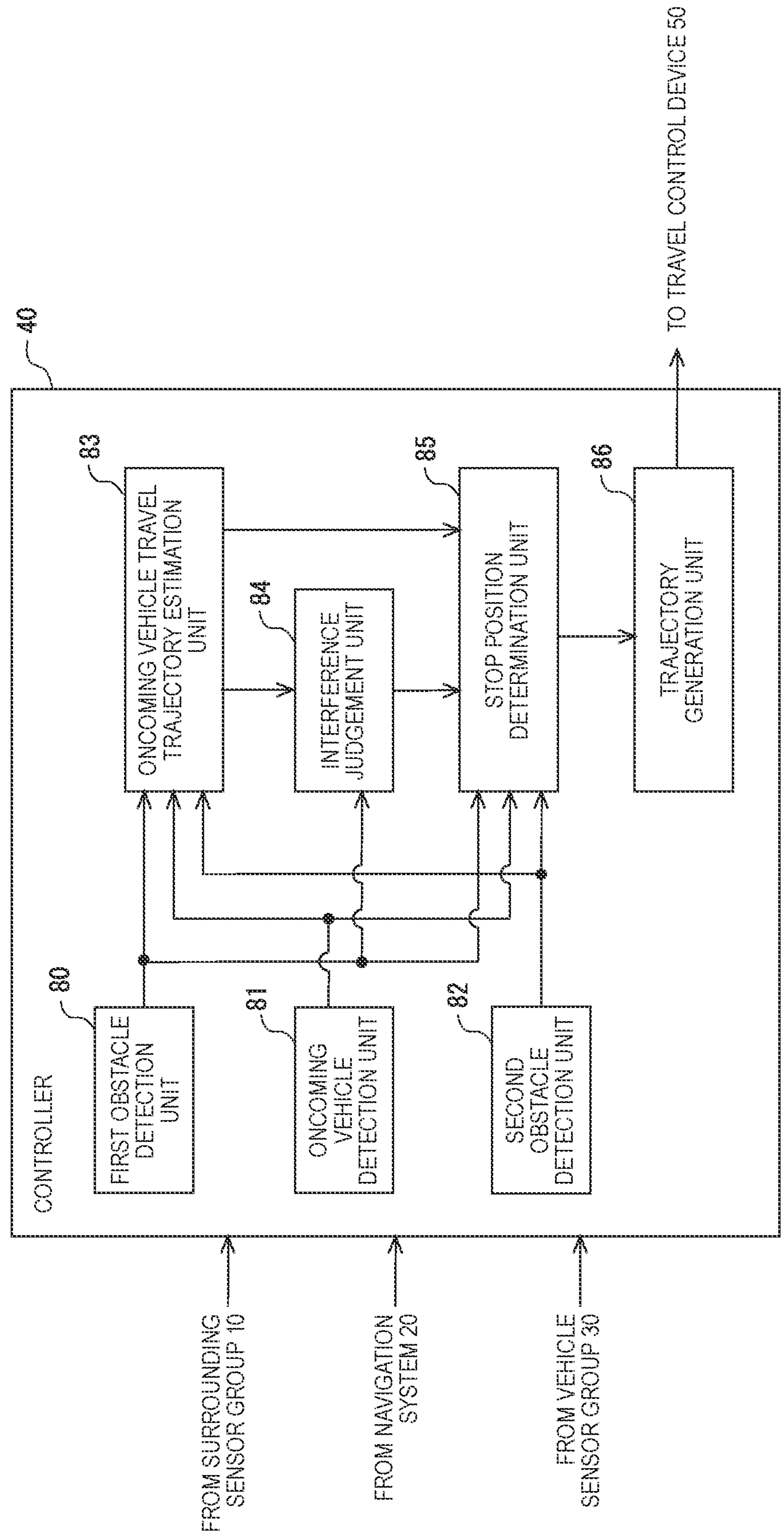
FIG. 3 is a block diagram illustrating an example of a controller according to the first embodiment.

Reference will be made to FIG. 3. The controller 40 of the driving assistance device 1 includes a first obstacle detection unit 80, an oncoming vehicle detection unit 81, a second obstacle detection unit 82, an oncoming vehicle travel trajectory estimation unit 83, an interference judgement unit 84, a stop position determination unit 85, and a trajectory generation unit 86. Functions of the first obstacle detection unit 80, the oncoming vehicle detection unit 81, the second obstacle detection unit 82, the oncoming vehicle travel trajectory estimation unit 83, the interference judgement unit 84, the stop position determination unit 85, and the trajectory generation unit 86 may be implemented, for example, by allowing the processor 41 of the controller 40 to execute a computer program stored in the storage device 42.

The first obstacle detection unit 80 receives the ambient environment information output from the surrounding sensor group 10. From the ambient environment information, the first obstacle detection unit 80 detects (identifies) the first obstacle 61 that is present on the first lane L1 where the host vehicle 60 is traveling and ahead in a course of the host vehicle 60, and acquires information such as a position of the first obstacle 61 as first obstacle information. Note that the communication unit 27 of the navigation system 20 may receive information such as the position of the first obstacle 61 detected by another vehicle through vehicle-to-vehicle communication or road-to-vehicle communication. The first obstacle detection unit 80 may acquire the information received by the communication unit 27 as the first obstacle information.

In the present specification, the "obstacle" is an avoidance target to be avoided by the host vehicle 60, and includes, for example, parked, stopped, and decelerating vehicles, such as a passenger vehicle, a large truck, and a motorcycle, and stationary objects other than vehicles, or moving objects at lower speeds than a specified vehicle speed of the road. The stationary objects other than vehicles include temporarily built objects on construction sites and the like and fallen objects on the road. The lower speed moving objects include bicycles, pedestrians, and animals.

The first obstacle detection unit 80 outputs the first obstacle information to the oncoming vehicle travel trajectory estimation unit 83, the interference judgement unit 84, and the stop position determination unit 85.

The oncoming vehicle detection unit 81 receives the ambient environment information output from the surrounding sensor group 10. From the ambient environment information, the first obstacle detection unit 80 detects (identifies) the oncoming vehicle 64 traveling on the second lane L2, which is the oncoming lane adjacent to the first lane L1, and approaching the host vehicle 60, and acquires information on the position of the incoming vehicle 64 and the like as oncoming vehicle information.

In addition, the oncoming vehicle detection unit 81 may detect (identify) a size (a longitudinal length and a vehicle width) of the oncoming vehicle 64 and a posture (for example, a yaw angle) thereof on the basis of point cloud data of the oncoming vehicle 64 measured by the range finder 11 and an image of the oncoming vehicle 64 captured by the camera 12, and may acquire information on the size and posture of the oncoming vehicle 64 as oncoming vehicle information.

Additionally, the oncoming vehicle detection unit 81 may acquire information on a vehicle type of the oncoming vehicle 64 as oncoming vehicle information on the basis of the image of the oncoming vehicle 64 captured by the camera 12.

For example, the oncoming vehicle detection unit 81 may identify the vehicle type of the oncoming vehicle 64 by pattern matching between images of various vehicles previously stored in the storage device 42 or the like of the controller 40 and the image of the oncoming vehicle 64 captured by the camera 12. Alternatively, for example, the oncoming vehicle detection unit 81 may transmit the image of the oncoming vehicle 64 captured by the camera 12 to an external device (for example, such as a server device) via the communication unit 27, and may receive information on the vehicle type of the oncoming vehicle 64 identified by the external device on the basis of the image of the oncoming vehicle 64 via the communication unit 27.

The oncoming vehicle detection unit 81 may acquire information on the size of the oncoming vehicle 64 as oncoming vehicle information on the basis of the vehicle type of the oncoming vehicle 64. For example, the storage device 42 or the like of the controller 40 may store a database in which the vehicle types of various vehicles are associated with information on sizes thereof. The oncoming vehicle detection unit 81 may identify the size of the oncoming vehicle 64 on the basis of the database and the vehicle type of the oncoming vehicle 64.

Additionally, for example, the oncoming vehicle detection unit 81 may transmit the information on the vehicle type of the oncoming vehicle 64 to an external device (such as, for example, a server device) via the communication unit 27, and may receive the information on the size of the oncoming vehicle 64 identified by the external device on the basis of the vehicle type of the oncoming vehicle 64 via the communication unit 27.

Furthermore, the oncoming vehicle detection unit 81 may acquire information on a driving skill level of the oncoming vehicle 64 as oncoming vehicle information. The oncoming vehicle detection unit 81 may receive the information on the driving skill level from the oncoming vehicle 64 via vehicle-to-vehicle communication or road-to-vehicle communication. The oncoming vehicle 64 may include a controller for calculating the driving skill level of the oncoming vehicle 64 on the basis of a driving history of a driver of the oncoming vehicle 64. For example, the driving skill level may be calculated on the basis of the driver's driving history, including slow or fast steering operation, slow or fast accelerator operation, slow or fast brake operation, and inter-vehicle distances.

Furthermore, the oncoming vehicle detection unit 81 may judge whether the oncoming vehicle 64 is an autonomous car or not on the basis of the vehicle type of the oncoming vehicle 64, and may acquire information on the driving skill level and control contents of autonomous driving of the oncoming vehicle 64 as information on the driving skill level of the oncoming vehicle 64. For example, the storage device 42 or the like of the controller 40 may store a database in which the vehicle types of various vehicles are associated with information on autonomous driving functions. The oncoming vehicle detection unit 81 may judge whether the oncoming vehicle 64 is an autonomous car or not on the basis of the database and the vehicle type of the oncoming vehicle 64, and may identify information on the driving skill level and control contents of autonomous driving of the oncoming vehicle 64.

Additionally, for example, the oncoming vehicle detection unit 81 may transmit the information on the vehicle type of the oncoming vehicle 64 to an external device (for example, such as a server device) via the communication unit 27, and may receive information on the driving skill level and control contents of the autonomous driving identified by the external device on the basis of the vehicle type of the oncoming vehicle 64 via the communication unit 27.

Note that the communication unit 27 may receive information on the position, size, posture, and vehicle type of the oncoming vehicle 64 from another vehicle, such as the oncoming vehicle 64, via vehicle-to-vehicle communication or road-to-vehicle communication. The oncoming vehicle detection unit 81 may acquire the information received by the communication unit 27 as oncoming vehicle information.

The oncoming vehicle detection unit 81 outputs the oncoming vehicle information to the oncoming vehicle travel trajectory estimation unit 83 and the stop position determination unit 85.

The second obstacle detection unit 82 receives the ambient environment information output from the surrounding sensor group 10. From the ambient environment information, the second obstacle detection unit 82 detects (identifies) the second obstacle 62 that is present on the second lane L2, which is the oncoming lane, and that lie ahead in the course of the host vehicle 60, and acquires information on a position and the like of the second obstacle 62 as second obstacle information. Note that the communication unit 27 of the navigation system 20 may receive information on the position and the like of the second obstacle 62 detected by another vehicle via vehicle-to-vehicle communication or road-to-vehicle communication. The second obstacle detection unit 82 may acquire the information received by the communication unit 27 as second obstacle information.

The second obstacle detection unit 82 outputs the second obstacle information to the oncoming vehicle travel trajectory estimation unit 83 and the stop position determination unit 85.

The oncoming vehicle travel trajectory estimation unit 83 judges whether or not the second obstacle 62 on the second lane L2 is nearer the host vehicle 60 than the first obstacle 61 on the first lane L1 on the basis of the first obstacle information and the second obstacle information. In other words, the oncoming vehicle travel trajectory estimation unit 83 judges whether or not a longitudinal distance (i.e., a distance in the traveling direction) between the second obstacle 62 and the host vehicle 60 is shorter than a longitudinal distance between the first obstacle 61 and the host vehicle 60.

The oncoming vehicle travel trajectory estimation unit 83 outputs a judgement result on whether or not the second obstacle 62 is nearer the host vehicle 60 than the first obstacle 61 to the stop position determination unit 85.

When the second obstacle 62 is nearer the host vehicle 60 than the first obstacle 61, the oncoming vehicle travel trajectory estimation unit 83 estimates a predicted travel trajectory along which the oncoming vehicle 64 is predicted to travel in the future.

For example, the oncoming vehicle travel trajectory estimation unit 83 may estimate the predicted travel trajectory of the oncoming vehicle 64 on the basis of the ambient environment information output from the surrounding sensor group 10, the first obstacle information, the second obstacle information, and the oncoming vehicle information. For example, in the driving scene illustrated in FIGS. 2A and 2B, the oncoming vehicle travel trajectory estimation unit 83 estimates a predicted travel trajectory of the oncoming vehicle 64 that avoids the second obstacle 62 on the second lane L2.

For example, the oncoming vehicle travel trajectory estimation unit 83 may detect a lane boundary of the second lane L2 from the ambient environment information. The oncoming vehicle travel trajectory estimation unit 83 may estimate the predicted travel trajectory of the oncoming vehicle 64 on the basis of a position of the lane boundary of the second lane L2, a movement history of the oncoming vehicle 64, a posture history of the oncoming vehicle 64, a vehicle speed of the oncoming vehicle 64, a relative positional relationship between the oncoming vehicle 64 and the first obstacle 61, a relative positional relationship between the oncoming vehicle 64 and the second obstacle 62, and the like.

Figure 4:
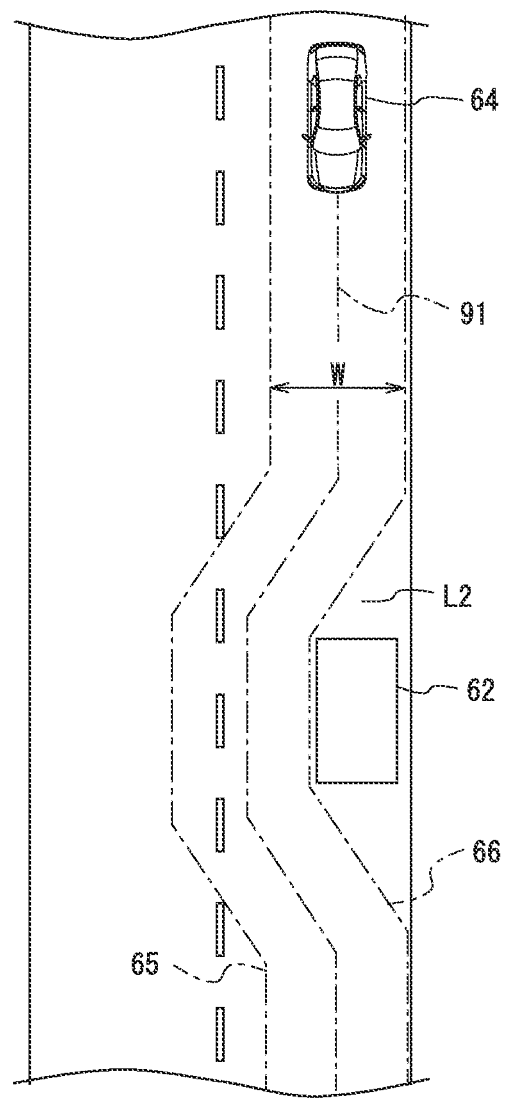
FIG. 4 is an illustrative diagram of a travel region of an oncoming vehicle.

Reference will be made to FIG. 4. An alternate long and short dash line 91 indicates a predicted travel trajectory of the oncoming vehicle 64. The oncoming vehicle travel trajectory estimation unit 83 predicts a travel region of the oncoming vehicle 64 surrounded by the predicted trajectory 65 along which the right end of the oncoming vehicle 64 can pass and the predicted trajectory 66 along which the left end of the oncoming vehicle 64 can pass on the basis of the predicted travel trajectory 91 of the oncoming vehicle 64.

For example, the oncoming vehicle travel trajectory estimation unit 83 may estimate, as the travel region, a region having a width W extending along the predicted travel trajectory 91 and being centered on the predicted travel trajectory 91.

The oncoming vehicle travel trajectory estimation unit 83 may set, as the width W, a length obtained by adding a predetermined margin to the vehicle width detected by the oncoming vehicle detection unit 81. For example, the oncoming vehicle travel trajectory estimation unit 83 may change a margin of the travel region of the oncoming vehicle 64 according to the driving skill level and the like of the oncoming vehicle 64 acquired by the oncoming vehicle detection unit 81. In other words, the oncoming vehicle travel trajectory estimation unit 83 may estimate the travel region of the oncoming region 64 on the basis of the driving skill level and the like of the oncoming vehicle 64.

For example, when the driving skill level of the oncoming vehicle 64 is low (for example, when the driving skill level of the driver or autonomous driving of the oncoming vehicle 64 is low or when performance or quality of the control contents of the autonomous driving is low), it is difficult to predict the travel trajectory of the oncoming vehicle 64, so that the predicted travel trajectory 91 is expected to fluctuate significantly. In this case, the margin of the travel region may be enlarged to increase the width W of the travel region.

On the contrary, when the driving skill level of the oncoming vehicle 64 is high, the travel trajectory of the oncoming vehicle 64 is expected to be predictable with high accuracy, so that the margin of the travel region may be reduced to reduce the width W of the travel region.

Reference will be made to FIG. 3. The oncoming vehicle travel trajectory estimation unit 83 outputs information on the estimated travel region of the oncoming region 64 to the interference judgement unit 84.

The interference judgement unit 84 judges whether or not the host vehicle 60 may interfere with the travel region of the oncoming vehicle 64 when the host vehicle 60 is stopped before the first obstacle 61 on the basis of the information of the travel region of the oncoming vehicle 64 and the first obstacle information.

Reference will be made to FIG. 2A. For example, the interference judgement unit 84 determines a stop position 63 where the host vehicle 60 is stopped before the first obstacle 61 and the host vehicle 60 and the oncoming vehicle 64 pass each other on the basis of a longitudinal position (i.e., a position in the traveling direction of the host vehicle 60, which position may hereinafter be referred to also as traveling direction position) of the first obstacle 61 indicated by the first obstacle information. For example, the interference judgement unit 84 may determine the longitudinal position and a lateral position (i.e., a vehicle width position) of the stop position 63 so that the host vehicle 60 can overtake the first obstacle 61 by smooth steering after the host vehicle 60 stopped at the stop position 63 and the oncoming vehicle 64 pass each other.

Furthermore, for example, the interference judgement unit 84 may judge whether or not the host vehicle 60 may interfere with the travel region of the oncoming vehicle 64 depending on whether or not a region occupied by the host vehicle 60 overlaps the travel region of the oncoming vehicle 64. For example, the interference judgement unit 84 may judge that the host vehicle 60 may interfere with the travel region of the oncoming vehicle 64 when a region occupied by the host vehicle 60 stopped at the stop position 63 overlaps the travel region of the oncoming vehicle 64. For example, the interference judgement unit 84 may judge that there is no possibility of interference between the host vehicle 60 and the travel region of the oncoming vehicle 64 when the region occupied by the host vehicle 60 does not overlap the travel region of the oncoming vehicle 64.

Reference will be made to FIG. 3. The interference judgement unit 84 outputs a judgement result on the possibility that the host vehicle 60 interferes with the travel region of the oncoming vehicle 64 to the stop position determination unit 85.

On the basis of the judgement result of the interference judgement unit 84, the stop position determination unit 85 determines a stop position for waiting for completion of the passing between the host vehicle 60 and the oncoming vehicle 64. When the host vehicle 60 may interfere with the travel region of the oncoming vehicle 64 when the host vehicle 60 is stopped before the first obstacle 61, the stop position determination unit 85 determines the first stop position 67 (see FIG. 2B) before the second obstacle 62 as the stop position of the host vehicle 60.

For example, the stop position determination unit 85 may determine a longitudinal position (i.e., a traveling direction position) of the first stop position 67, for example, the longitudinal distance (i.e., the traveling direction distance) between the second obstacle 62 and the host vehicle 60 so that the host vehicle 60 stopped at the first stop position 67 does not interfere with the travel region of the oncoming vehicle 64 that avoids the second obstacle 62 and returns to the second lane L2.

For example, the stop position determination unit 85 may determine the longitudinal position of the first stop position 67 so as to be located before a section where the travel region of the oncoming vehicle 64 crosses over into the first lane L1.

Figure 5A:
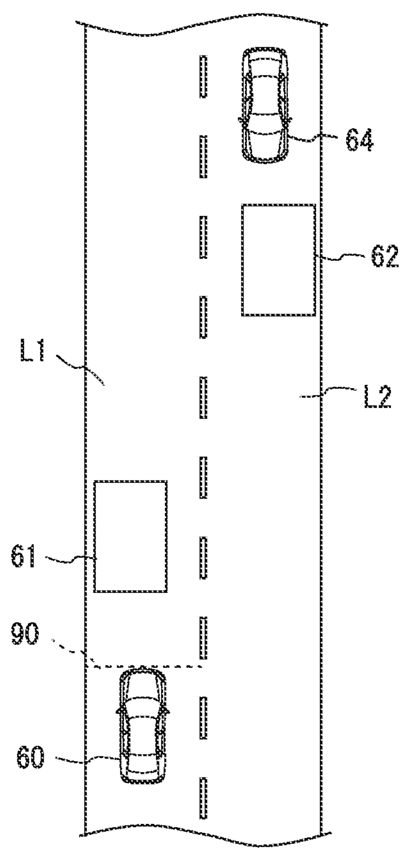
FIG. 5A is an illustrative diagram of a first example of a case where a stop position is determined with reference to a longitudinal position of an obstacle on a lane where a host vehicle is traveling.

Reference will be made to FIG. 5A. When the oncoming vehicle travel trajectory estimation unit 83 judges that the first obstacle 61 is nearer the host vehicle 60 than the second obstacle 62, the stop position determination unit 85 determines a stop position 90 on the basis of a longitudinal direction (i.e., a traveling direction position) of the first obstacle 61 indicated by the first obstacle information. At the stop position 90, the host vehicle 60 waits for completion of passing between the host vehicle 60 and the oncoming vehicle 64. The stop position determination unit 85 may set the stop position 90, for example, to a position before the first obstacle 61 by a predetermined distance such that the host vehicle 60 can avoid the first obstacle 61.

Figure 5B:
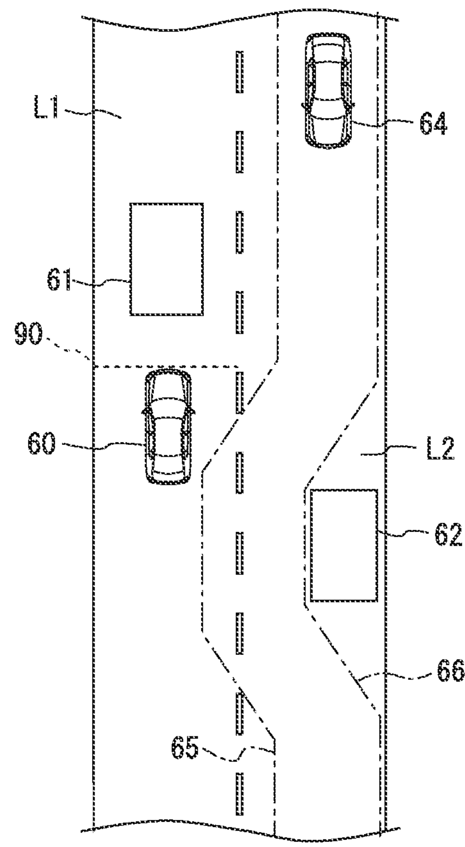
FIG. 5B is an illustrative diagram of a second example of the case where the stop position is determined with reference to the longitudinal position of the obstacle on the lane where the host vehicle is traveling.

Reference will be made to FIG. 5B. Even when the stop position 90 is present to stop the host vehicle 60 before the first obstacle 61 so that the host vehicle 60 does not interfere with the travel region of the oncoming vehicle 64, the stop position determination unit 85 determines the stop position 90 on the basis of a longitudinal position (i.e., a traveling direction position) of the first obstacle 61 indicated by the first obstacle information.

As illustrated in FIGS. 5A and 5B, when determining the stop position 90 at the position before the first obstacle 61, the interference judgement unit 84 may determine a longitudinal position and a lateral position (i.e., a vehicle width position) of the stop position 90 so that the host vehicle 60 can overtake (avoid) the first obstacle 61 by smooth steering after passing between the host vehicle 60 stopped at the stop position 90 and the oncoming vehicle 64. Note that the longitudinal position and lateral position of the stop position 90 may be previously determined positions where a distance enough to allow the host vehicle 60 to avoid the first obstacle 61 is maintained with respect to the first obstacle 61 or may be positions set on the basis of a travel region calculated to allow the host vehicle 60 to avoid the first obstacle 61 by smooth steering.

Reference will be made to FIG. 3. The stop position determination unit 85 outputs information on the determined stop position of the host vehicle 60 to the trajectory generation unit 86.

The trajectory generation unit 86 generates a travel trajectory to be traveled by the host vehicle on the basis of the ambient environment information output from the surrounding sensor group 10, the road map data and the travel route output from the navigation system 20, the vehicle information and the like output from the vehicle sensor group 30.

The trajectory generation unit 86 generates a travel trajectory to allow the host vehicle 60 to reach the stop position determined by the stop position determination unit 85 so that the host vehicle 60 stops and waits for completion of the passing of the oncoming vehicle 64 before avoiding the first obstacle 61.

The trajectory generation unit 86 may generate the travel trajectory in such a manner as to include a speed profile for allowing the host vehicle to stop at the stop position or decelerate and pass the stop position on the basis of the vehicle information and the like output from the vehicle sensor group 30. The trajectory generation unit 86 outputs the generated travel trajectory to the travel control device 50.

The travel control device 50 performs driving assistance by causing the host vehicle 60 to travel to the stop position determined by the stop position determination unit 85 and stopping the host vehicle 60 at the stop position on the basis of the travel trajectory generated by the trajectory generation unit 86.

For example, when the host vehicle 60 may interfere with the travel region of the oncoming vehicle 64 when the second obstacle 62 is present on a nearer side than the first obstacle 61 in the traveling direction of the host vehicle 60 and the host vehicle 60 is stopped before the first obstacle 61, the host vehicle 60 is caused to travel to the first stop position 67 before the second obstacle 62 in the traveling direction of the host vehicle 60, as illustrated in FIG. 2B, and then the host vehicle 60 is stopped at the first stop position 67.

Thus, when the host vehicle 60 stands by at the position before the second obstacle 62, it is possible to prevent the host vehicle 60 from obstructing the travel of the oncoming vehicle 64 that avoids the second obstacle 62.

Additionally, for example, when the first obstacle 61 is present on a nearer side than the second obstacle 62 in the traveling direction of the host vehicle 60, the host vehicle 60 does not obstruct the travel of the oncoming vehicle 64 that avoids the second obstacle 62 even when the host vehicle 60 stops at the stop position 90 determined on a side before the first obstacle 61 in the traveling direction of the host vehicle 60 with reference to the position of the first obstacle 61 as illustrated in FIG. 5A.

The same applies to the case where the stop position 90 is present to stop the host vehicle 60 before the first obstacle 61 so that the host vehicle 60 does not interfere with the travel region of the oncoming vehicle 64, as illustrated in 5B. In these cases, the travel control device 50 causes the host vehicle 60 to travel to the stop position 90 determined on the basis of the longitudinal position (i.e., the traveling direction position) of the first obstacle 61, and then stops the host vehicle 60 at the stop position 90.

(Driving Assistance Method)

Figure 6:
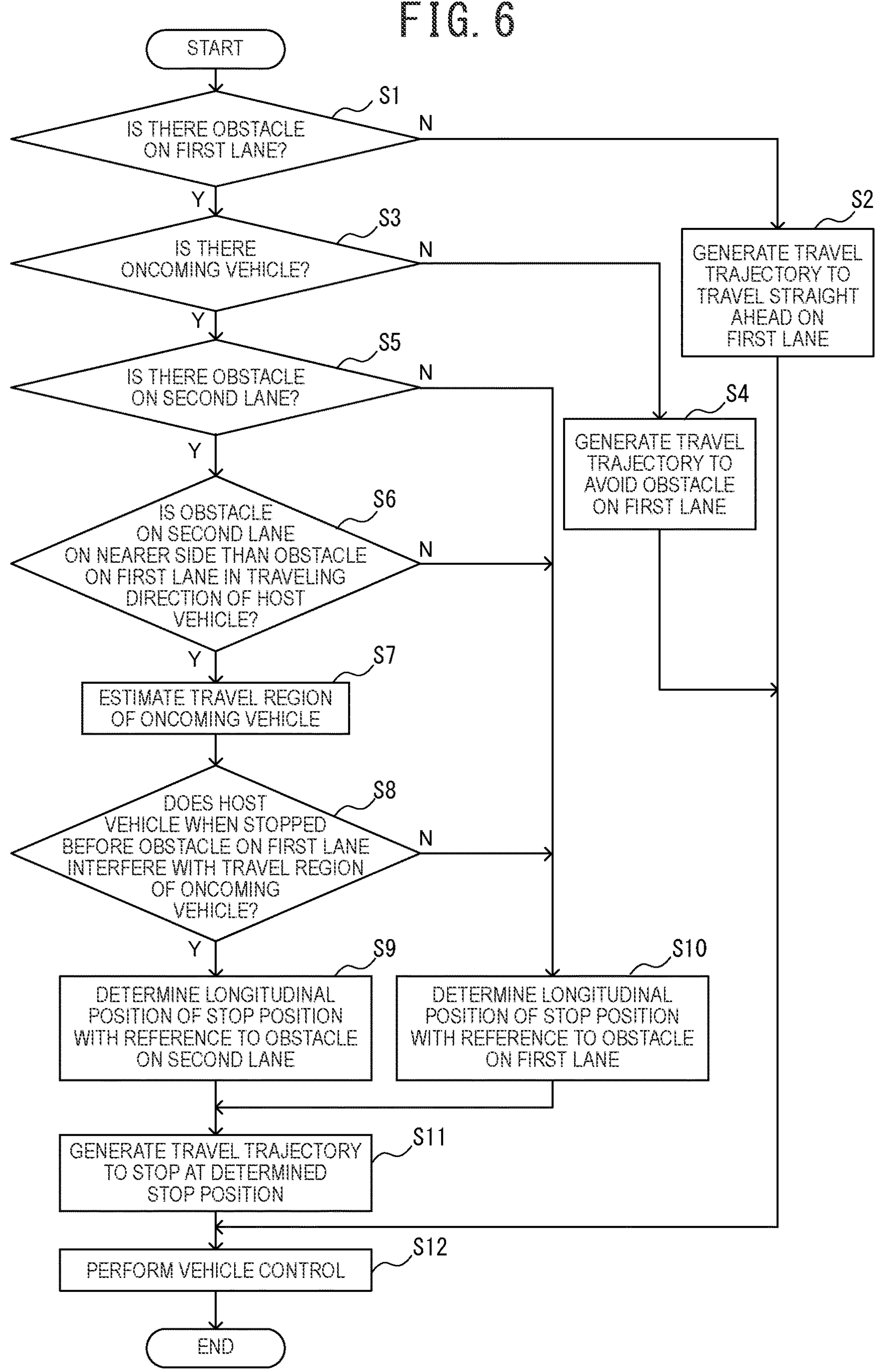
FIG. 6 is a flowchart illustrating an example of a driving assistance method according to a first embodiment.

Next, an example of a driving assistance method according to the first embodiment will be described with reference to a flowchart of FIG. 6.

At step S1, the first obstacle detection unit 80 judges whether or not the first obstacle 61 is present ahead in the course of the host vehicle 60 on the first lane L1. When the first obstacle 61 is present (step S1: Y), processing proceeds to step S3. When the first obstacle 61 is not present (step S1: N), processing proceeds to step S2.

At step S2, the trajectory generation unit 86 generates a travel trajectory to travel straight ahead on the first lane L1. Then, processing proceeds to step S12.

At step S3, the oncoming vehicle detection unit 81 judges whether the oncoming vehicle 64 that is traveling on the second lane L2, which is the oncoming lane, and approaching the host vehicle 60 is present or not. When the oncoming vehicle 64 is present (step S3: Y), processing proceeds to step S5. When the oncoming vehicle 64 is not present (step S3: N), processing proceeds to step S4.

At step S4, the trajectory generation unit 86 generates a travel trajectory to travel avoiding the first obstacle 61 on the first lane L1. Then, processing proceeds to step S12.

At step S5, the second obstacle detection unit 82 judges whether the second obstacle 62 is present or not on the second lane L2 and ahead in the traveling direction of the host vehicle 60. When the second obstacle 62 is present (step S5: Y), processing proceeds to step S6. When the second obstacle 62 is not present (step S5: N), processing proceeds to step S10.

At step S6, the oncoming vehicle travel trajectory estimation unit 83 judges whether or not the position of the second obstacle 62 on the second lane L2 is on a nearer side than the position of the first obstacle 61 on the first lane L1 in the traveling direction of the host vehicle 60. When the position of the second obstacle 62 is on the nearer side than the position of the first obstacle 61 in the traveling direction of the host vehicle 60 (step S6: Y), processing proceeds to step S7. When the first obstacle 61 is nearer the host vehicle 60 than the second obstacle 62 (step S6: N), processing proceeds to step S10.

At step S7, the oncoming vehicle travel trajectory estimation unit 83 estimates the predicted travel trajectory 91 of the oncoming vehicle 64 that travels avoiding the second obstacle 62, and, on the basis of the predicted travel trajectory 91, estimates the travel region of the oncoming vehicle 64 that travels avoiding the second obstacle 62.

At step S8, the interference judgement unit 84 judges whether or not the host vehicle 60 may interfere with the travel region of the oncoming vehicle 64 when the host vehicle 60 is stopped before the first obstacle 61.

When the host vehicle 60 may interfere with the travel region of the oncoming vehicle 64 (step S8: Y), processing proceeds to step S9. When the host vehicle 60 can be stopped before the first obstacle 61 without interfering with the travel region of the oncoming vehicle 64 (step S8: N), processing proceeds to step S10.

At step S9, the stop position determination unit 85 determines the longitudinal position (i.e., the traveling direction position) of the first stop position 67 for stopping the host vehicle 60 with reference to the position of the second obstacle 62 on the second lane L2. For example, the stop position determination unit 85 determines the longitudinal position of the first stop position 67 so as to be before the second obstacle 62. Then, processing proceeds to step S11.

At step S10, the stop position determination unit 85 determines the longitudinal position (i.e., the traveling direction position) of the stop position 90 for stopping the host vehicle 60 with reference to the position of the first obstacle 61 on the first lane L1. Then, processing proceeds to step S11.

At step S11, the trajectory generation unit 86 generates a travel trajectory to reach the stop position determined by the stop position determination unit 85.

At step S12, the travel control device 50 performs driving assistance that allows the host vehicle 60 to travel to the stop position determined by the stop position determination unit 85 and stops the host vehicle 60 at the stop position on the basis of the travel trajectory generated by the trajectory generation unit 86. Then, processing is ended.

Note that, in the driving assistance method described in the above embodiment, the travel control device 50 stops the host vehicle 60 at the stop position determined by the stop position determination unit 85, but the present invention is not limited thereto. For example, the stop position determined by the stop position determination unit 85 may be displayed on a navigation screen to show the stop position to the driver of the host vehicle 60, whereby the host vehicle 60 may be assisted to stop at the stop position.

Effects of First Embodiment (1) The first obstacle detection unit 80 detects the position of the first obstacle 61 ahead in the traveling direction of the host vehicle 60 on the first lane L1 where the host vehicle 60 is traveling. The second obstacle detection unit 82 detects the position of the second obstacle 62 ahead in the traveling direction of the host vehicle 60 on the second lane L2, which is the oncoming lane adjacent to the first lane L1. When the position of the second obstacle 62 is on the nearer side than the position of the first obstacle 61 in the traveling direction of the host vehicle 60, the stop position determination unit 85 determines the stop position of the host vehicle 60 to the first stop position 67 before the second obstacle 62, and assists the host vehicle 60 to stop at the first stop position 67.

By stopping the host vehicle 60 at such a position, the host vehicle 60 can wait for passing between the host vehicle 60 and the oncoming vehicle 64 without obstructing the travel of the oncoming vehicle 64 that avoids the second obstacle 62. In other words, it is possible to prevent the travel of the oncoming vehicle 64 from being obstructed by the host vehicle 60 stopped in response to the obstacle ahead of the host vehicle 60 and the second obstacle 62 on the oncoming lane L2. This eliminates the risk of traffic obstruction. Thus, there can be provided an improved travel trajectory generation technology that has improved the quality of a travel trajectory for autonomous driving of the host vehicle 60.

The technology can contribute to improvement of fuel efficiency since it is possible to prevent unnecessary driving, such as backing the host vehicle 60 to allow for passing of the oncoming vehicle 64 after stopping the host vehicle 60 at a position where the travel of the oncoming vehicle 64 is obstructed.

(2) When the host vehicle 60 may interfere with the travel region of the oncoming vehicle 64 when the position of the second obstacle 62 is on the nearer side than the position of the first obstacle 61 in the traveling direction of the host vehicle 60 and the host vehicle 60 is stopped before the first obstacle 61, the stop position determination unit 85 may determine the stop position of the host vehicle 60 to the first stop position 67.

As a result, the stop position of the host vehicle 60 can be switched on the basis of whether or not the host vehicle 60 obstructs the travel of the oncoming vehicle 64. Thus, the host vehicle 60 can wait for the passing between the host vehicle 60 and the oncoming vehicle 64 without obstructing the travel of the oncoming vehicle 64 that avoids the second obstacle 62.

(3) The oncoming vehicle travel trajectory estimation unit 83 may estimate the travel region of the oncoming vehicle 64. The interference judgement unit 84 may judge the possibility that the host vehicle 60 interferes with the travel region of the oncoming vehicle 64 depending on whether or not the estimated travel region overlaps the region occupied by the host vehicle 60 when stopped before the first obstacle 61.

As a result, it can be judged whether or not the stopped host vehicle 60 may interfere with the travel region of the oncoming vehicle 64.

(4) The oncoming vehicle detection unit 81 may judge the driving skill level of the oncoming vehicle 64. The oncoming vehicle travel trajectory estimation unit 83 may estimate the travel region of the oncoming vehicle 64 according to the driving skill level.

As a result, the host vehicle 60 can be caused to stand by at a safe position even when the driving skill level of the oncoming vehicle 64 is low.

(5) When the second obstacle 62 is farther from the host vehicle 60 than the first obstacle 61, the stop position determination unit 85 may determine the stop position of the host vehicle 60 with reference to the longitudinal position (i.e., the traveling direction position) of the first obstacle 61.

When the second obstacle 62 is farther from the host vehicle 60 than the first obstacle 61, there is no interference between the travel of the oncoming vehicle 64 that avoids the second obstacle 62 and the host vehicle 60 even when the host vehicle 60 stops at any position before the first obstacle 61. Accordingly, in this case, the host vehicle 60 can avoid the first obstacle 61 more quickly by advancing the host vehicle 60 to a position near the first obstacle 61 before passing of the oncoming vehicle 64.

Second Embodiment

The structure of a driving assistance device 1 according to a second embodiment is basically the same as the structure of the driving assistance device 1 according to the first embodiment illustrated in FIG. 1. Additionally, the functional structure of a controller 40 according to the second embodiment is basically the same as the functional structure of the controller 40 illustrated in FIG. 3.

Figure 7:
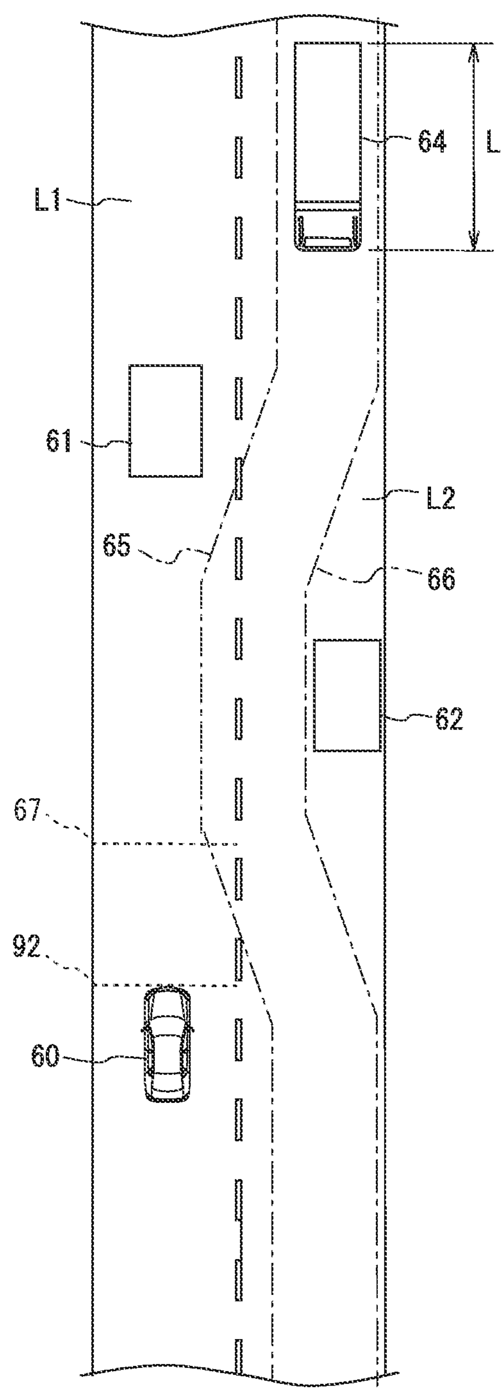
FIG. 7 is a schematic diagram illustrating an example of a driving scene where a driving assistance device according to a second embodiment is applied.

Reference will be made to FIG. 7. The driving assistance device 1 according to the second embodiment determines the first stop position 67 so that the host vehicle 60 stopped at the first stop position 67 does not interfere with the travel region of the oncoming vehicle 64 that avoids the second obstacle 62 and returns to the second lane L2, as with the first embodiment.

Next, the driving assistance device 1 according to the second embodiment judges the size of the oncoming vehicle 64. The driving assistance device 1 may judge, as the size of the oncoming vehicle 64, for example, a longitudinal length L of the oncoming vehicle 64, or the vehicle width of the oncoming vehicle 64. When the size of the oncoming vehicle 64 exceeds a threshold value, the first stop position is corrected to a position 92 located on a nearer side in the traveling direction of the host vehicle 60 with respect to the second obstacle 62. In other words, when the size of the oncoming vehicle 64 exceeds the threshold value, the first stop position is corrected to the nearer side in the traveling direction of the host vehicle 60 with respect to the second obstacle 62.

Thus, when the size of the oncoming vehicle 64 exceeds the threshold value, the first stop position is set on the nearer side in the traveling direction of the host vehicle 60 with respect to the second obstacle 62 than when the size of the oncoming vehicle 64 does not exceed the threshold value, which enables the host vehicle 60 to wait for completion of passing between the oncoming vehicle 64 and the host vehicle 60 at a position away from a position where the oncoming vehicle 64 crosses over into the first lane L1 (or a position where the oncoming vehicle 64 approaches the first lane L1) in order to avoid the second obstacle 62. This can, for example, reduce a fear felt by the vehicle occupant at the time of passing of a large oncoming vehicle 64, such as a truck or a large trailer.

Specifically, the stop position determination unit 85 illustrated in FIG. 3 determines the longitudinal position (i.e., the traveling direction position) of the first stop position 67 so that the host vehicle 60 stopped at the first stop position 67 does not interfere with the travel region of the oncoming vehicle 64 that avoids the second obstacle 62 and returns to the second lane L2.

Next, the stop position determination unit 85 judges whether or not the size of the oncoming vehicle 64 exceeds a predetermined threshold value on the basis of the oncoming vehicle information output by the oncoming vehicle detection unit 81.

When the size of the oncoming vehicle 64 exceeds the predetermined threshold value, the stop position determination unit 85 corrects the first stop position to the position 92 on the nearer side in the traveling direction of the host vehicle 60 with respect to the second obstacle 62 than when the size of the oncoming vehicle 64 does not exceed the threshold value.

Next, an example of a driving assistance method according to the second embodiment will be described with reference to a flowchart of FIG. 8. The processing of steps S21 to S29 is the same as that of steps S1 to S9 described with reference to FIG. 6. The processing of steps S32 to S34 is the same as that of steps S10 to S12 described with reference to FIG. 6.

At step S29, the stop position determination unit 85 determines the longitudinal position of the first stop position 67 with reference to the position of the second obstacle 62, and then, processing proceeds to step S30.

At step S30, the stop position determination unit 85 judges whether or not the size of the oncoming vehicle 64 is equal to or less than the threshold value. When the size of the oncoming vehicle 64 is equal to or less than the threshold value (step S30: Y), processing proceeds to step S33. In this case, the first stop position 67 determined at step S29 is not corrected and then determined as the stop position of the host vehicle 60.

When the size of the oncoming vehicle 64 exceeds the threshold value (step S30: N), processing proceeds to step S31.

At step S31, the stop position determination unit 85 shifts the first stop position 67 determined at step S29 backward.

In other words, the stop position determination unit 85 corrects the first step position to the position 92 farther from the second obstacle 62. Then, processing proceeds to step S33.

Effects of Second Embodiment

The oncoming vehicle detection unit 81 judges the size of the oncoming vehicle 64. When the size of the oncoming vehicle 64 exceeds a threshold value, the stop position determination unit 85 sets the first stop position to the position on the nearer side in the traveling direction of the host vehicle 60 with respect to the second obstacle 62 than when the size of the oncoming vehicle 64 does not exceed the threshold value.

Thus, by setting the first stop position to the position on the nearer side in the traveling direction of the host vehicle 60 with respect to the second obstacle 62, the host vehicle 60 can wait for completion of passing between the oncoming vehicle 64 and the host vehicle 60 at the position away from the position where the oncoming vehicle 64 crosses over into the first lane L1 (or the position where the oncoming vehicle 64 approaches the first lane L1) in order to avoid the second obstacle 62. This can, for example, reduce a fear felt by the vehicle occupant at the time of passing of a large oncoming vehicle 64, such as a truck or a large trailer.

Third Embodiment

The structure of a driving assistance device 1 according to a third embodiment is basically the same as the structure of the driving assistance device 1 according to the first embodiment illustrated in FIG. 1. Additionally, the functional structure of a controller 40 according to the third embodiment is basically the same as the structure of the controller 40 illustrated in FIG. 3.

Figure 9:
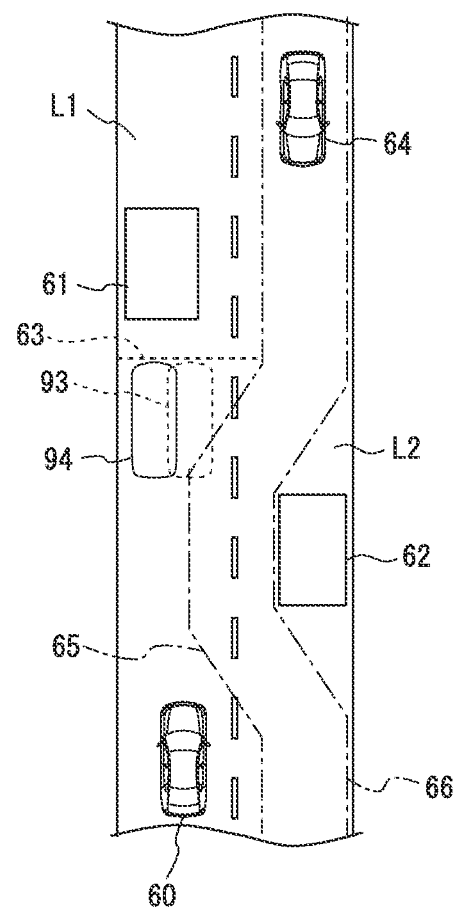
FIG. 9 is a schematic diagram illustrating an example of a driving scene where a driving assistance device according to a third embodiment is applied.

Reference will be made to FIG. 9. The interference judgement unit 84 of the controller 40 according to the third embodiment judges whether or not the host vehicle 60 may interfere with the travel region of the oncoming vehicle 64 that avoids the second obstacle 62 when the host vehicle 60 stops at a stop position (hereinafter referred to as "second stop position") 93 before the first obstacle 61 in the traveling direction of the host vehicle 60. The second stop position 93 may be determined in the same manner as the stop position 90 described with reference to, for example, FIGS. 5A and 5B.

When the host vehicle 60 stopped at the second stop position 93 may interfere with the travel region of the oncoming vehicle 64, the stop position determination unit 85 determines a stop position (hereinafter referred to as "third stop position") 94 by moving the second stop position 93 in a lateral direction (a lane width direction) and in a direction away from the oncoming vehicle 64 so as to be away from the second lane L2. In other words, when the vehicles are obliged to travel on the left side, the second stop position 93 is moved to the left to determine the third stop position 94. When the vehicles are obliged to travel on the right side, the second stop position 93 is moved to the right to determine the third stop position 94.

The stop position determination unit 85 judges whether or not the host vehicle 60 stopped at the third stop position 94 may interfere with the travel region of the oncoming vehicle 64.

When the host vehicle 60 stopped at the third stop position 94 does not interfere with the travel region of the oncoming vehicle 64, the stop position determination unit 85 determines the stop position of the host vehicle 60 to the third stop position 94. The host vehicle 60 stops at the third stop position 94 before avoiding the first obstacle 61, and waits for completion of passing of the oncoming vehicle 64.

Next, an example of a driving assistance method according to the third embodiment will be described with reference to a flowchart of FIG. 10. The processing of steps S41 to S47 is the same as the processing of steps S1 to S7 described with reference to FIG. 6. The processing of steps S51 to S54 is the same as the processing of steps S9 to S12 described with reference to FIG. 6.

At step S47, the oncoming vehicle travel trajectory estimation unit 83 estimates the travel region of the oncoming vehicle 64, and then, the interference judgement unit 84 determines the second stop position 93 before the first object 61 with reference to the longitudinal position (i.e., the traveling direction position) of the first obstacle 61. At step S48, the interference judgement unit 84 judges whether or not the host vehicle 60 may interfere with the travel region of the oncoming vehicle 64 when the host vehicle 60 stops at the second stop position 93.

When the host vehicle 60 stopped at the second stop position 93 may interfere with the travel region of the oncoming vehicle 64 (step S48: Y), processing proceeds to step S49. When the host vehicle 60 stopped at the second stop position 93 does not interfere with the travel region of the oncoming vehicle 64 (step S48: N), processing proceeds to step S52.

At step S49, the stop position determination unit 85 moves the second stop position 93 in the lateral direction so as to be away from the second lane L2 in the lane width direction to determine the third stop position 94.

The stop position determination unit 85 judges whether or not the host vehicle 60 stopped at the third stop position 94 may interfere with the travel region of the oncoming vehicle 64. When the host vehicle 60 interferes with the travel region of the oncoming vehicle 64 (step S49: Y), processing proceeds to step S51. In this case, the stop position determination unit 85 determines the longitudinal position of the first stop position 67 with reference to the position of the second obstacle 62.

When the host vehicle 60 does not interfere with the travel region of the oncoming vehicle 64 (step S49: N), processing proceeds to step S50.

At step S50, the stop position determination unit 85 determines, as the stop position of the host vehicle 60, the third stop position 94 determined by moving the second stop position 93 in the lateral direction so as to be away from the second lane L2. Then, processing proceeds to step S53.

Effects of Third Embodiment

The interference judgement unit 84 judges whether or not the host vehicle 60 may interfere with the travel region of the oncoming vehicle 64 that avoids the second obstacle 62 when the host vehicle 60 stops at the second stop position 93 before the first obstacle 61. When the host vehicle 60 stopped at the second stop position 93 may interfere with the travel region of the oncoming vehicle 64, the stop position determination unit 85 moves the second stop position 93 in the lateral direction so as to be away from the second lane L2 in the lane width direction, thereby determining the third stop position 94. When the host vehicle 60 stopped at the third stop position 94 does not interfere with the travel region of the oncoming vehicle 64, the stop position determination unit 85 determines the stop position of the host vehicle 60 to the third stop position 94.

As a result, while the host vehicle 60 can be stopped at the position where the host vehicle 60 does not interfere with the travel of the oncoming vehicle 64, the host vehicle 60 can be advanced to the position near the first obstacle 61 before passing of the oncoming vehicle 64. Thus, the host vehicle 60 can avoid the first obstacle 61 more quickly.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

Reference Signs List

- 1: Driving assistance device
- 2: Travel trajectory generation device
- 10: Surrounding sensor group
- 11: Range finder
- 12: Camera
- 20: Navigation system
- 21: Navigation controller
- 22: Positioning device
- 23: Map database
- 24: Display unit
- 25: Operation unit
- 26: Audio output unit
- 27: Communication unit
- 30: Vehicle sensor group
- 31: Vehicle speed sensor
- 32: Acceleration sensor
- 33: Gyro sensor

34: Steering angle sensor
35: Accelerator sensor
36: Brake sensor
40: Controller
41: Processor
42: Storage device
50: Travel control device
51: Actuator group
52: Steering actuator
53: Accelerator position actuator
54: Brake control actuator
60: Host vehicle
L1: First lane
61: First obstacle
L2: Oncoming lane
62: Second obstacle
64: Oncoming vehicle
80: First obstacle detection unit
81: Oncoming vehicle detection unit
82: Second obstacle detection unit
83: Oncoming vehicle travel trajectory estimation unit
84: Interference judgement unit
85: Stop position determination unit
86: Trajectory generation unit

The invention claimed is:

1. A driving assistance method comprising:

detecting a position of a first obstacle ahead of a host vehicle on a first lane where the host vehicle is traveling;

detecting a position of a second obstacle ahead of the host vehicle on a second lane, the second lane being an oncoming lane adjacent to the first lane;

when the host vehicle stopping before the first obstacle in a traveling direction of the host vehicle may interfere with travel of an oncoming vehicle, determining a stop position of the host vehicle based on whether the position of the first obstacle or the position of the second obstacle is closer to the host vehicle in the traveling direction of the host vehicle, wherein the stop position is before the position of the second obstacle in the traveling direction when the position of the second obstacle is closer to the host vehicle in the traveling direction than the position of the first obstacle; and assisting the host vehicle to stop at the determined stop position.

2. The driving assistance method according to claim 1, including:

when the position of the second obstacle is further from the host vehicle in the traveling direction than the position of the first obstacle or when the host vehicle stopping before the first obstacle may not interfere with travel of the oncoming vehicle, determining the stop position to a position to be before the first obstacle in the traveling direction of the host vehicle.

3. The driving assistance method according to claim 2, comprising estimating a travel region of the oncoming vehicle and judging a possibility that the host vehicle interferes with the travel of the oncoming vehicle depending on whether or not the estimated travel region of the oncoming vehicle overlaps a region occupied by the host vehicle when stopped before the first obstacle.

4. The driving assistance method according to claim 3, comprising judging a driving skill level of the oncoming vehicle and estimating the travel region according to the driving skill level.

5. The driving assistance method according to claim 2, comprising judging a size of the oncoming vehicle, wherein when the size of the oncoming vehicle exceeds a threshold value, the stop position is set on a nearer side in the traveling direction of the host vehicle with respect to the second obstacle than when the size of the oncoming vehicle does not exceed the threshold value.

6. The driving assistance method according to claim 2, wherein the stop position is moved in a lateral direction away from the second lane.

7. The driving assistance method according to claim 1, wherein when the position of the second obstacle is ahead of the position of the first obstacle in the traveling direction of the host vehicle, the stop position of the host vehicle is determined with reference to the position of the first obstacle.

8. The driving assistance method according to claim 2, including:

when the position of the second obstacle is closer to the host vehicle in the traveling direction than the position of the first obstacle and when the host vehicle stopping before the first obstacle may not interfere with travel of the oncoming vehicle, determining the stop position to be before the first obstacle and ahead of the second obstacle in the traveling direction of the host vehicle.

9. A driving assistance device comprising:

a sensor configured to detect a position of a first obstacle ahead of a host vehicle on a first lane where the host vehicle is traveling and detect a position of a second obstacle ahead of the host vehicle on a second lane, the second lane being an oncoming lane adjacent to the first lane;

a controller configured to:

determine whether the first obstacle or the second obstacle is closer to the host vehicle in a traveling direction of the host vehicle and whether the host vehicle may interfere with travel of an oncoming vehicle if the host vehicle is stopped before the first obstacle;

when the host vehicle stopping before the first obstacle may interfere with travel of the oncoming vehicle, determine a stop position of the host vehicle based on whether the first obstacle or the second obstacle is closer to the host vehicle in the traveling direction of the host vehicle, wherein the stop position is before the second obstacle in the traveling direction when the second obstacle is closer to the host vehicle in the traveling direction than the first obstacle; and a travel control device configured to perform driving assistance on a basis of the determined stop position.

10. The driving assistance device according to claim 9, wherein the controller is configured to, when the position of the second obstacle is further from the host vehicle in the traveling direction than the position of the first obstacle or when the host vehicle stopping before the first obstacle may not interfere with travel of the oncoming vehicle, determine the stop position to a position to be before the first obstacle in the traveling direction of the host vehicle.

11. The driving assistance device according to claim 10, wherein when the position of the second obstacle is closer to the host vehicle in the traveling direction than the position of the first obstacle and when the host vehicle stopping before the first obstacle may not interfere with travel of the oncoming vehicle, the stop position of the host vehicle is determined to be before the first obstacle and ahead of the second obstacle in the traveling direction of the host vehicle.

12. A driving assistance method comprising:

detecting, by one or more sensors, a position of an obstacle ahead of a host vehicle on an adjacent, oncoming lane;

judging, by one or more controllers, a size of an oncoming vehicle;

determining, by the one more controllers, a stop position of the host vehicle based on whether the size of the oncoming vehicle exceeds a threshold value, wherein the determined stop position is set closer in a traveling direction of the host vehicle to the detected position of the obstacle when the size of the oncoming vehicle exceeds the threshold value than when the size of the oncoming vehicle is less than the threshold value; and controlling, by the one or more controllers, the host vehicle to stop at the determined stop position.

* * * * *